(12) United States Patent
Yasunaga

(10) Patent No.: US 8,453,689 B2
(45) Date of Patent: Jun. 4, 2013

(54) TIRE VULCANIZING DIE AND PNEUMATIC TIRE

(75) Inventor: Toshikazu Yasunaga, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 413 days.

(21) Appl. No.: 12/717,160

(22) Filed: Mar. 4, 2010

(65) Prior Publication Data

US 2010/0243116 A1   Sep. 30, 2010

(30) Foreign Application Priority Data

Mar. 30, 2009   (JP) .................. 2009-082716

(51) Int. Cl.
*B60C 11/24* (2006.01)
*B60C 11/13* (2006.01)

(52) U.S. Cl.
USPC ...................... 152/154.2; 152/209.22; 425/35

(58) Field of Classification Search
USPC ............... 152/154.2, 209.22; 425/35
See application file for complete search history.

(56) References Cited

U.S. PATENT DOCUMENTS

| | | | |
|---|---|---|---|
| 7,195,044 B2 * | 3/2007 | Maxwell et al. | 152/209.21 |
| 2006/0042738 A1 * | 3/2006 | Matsumoto | 152/209.21 |

FOREIGN PATENT DOCUMENTS

| | | | |
|---|---|---|---|
| JP | 1-208206 | * | 8/1989 |
| JP | 2002-225514 | | 8/2002 |
| JP | 2003-251632 | * | 9/2003 |
| JP | 2006-088585 | | 4/2006 |
| JP | 2006-205824 | | 8/2006 |

* cited by examiner

*Primary Examiner* — Steven D Maki
*Assistant Examiner* — Robert Dye
(74) *Attorney, Agent, or Firm* — Fish & Richardson P.C.

(57) ABSTRACT

An object of the present invention is to provide a pneumatic tire, in which a light is prevented from occurring on a wear indicator itself, edge portions and surfaces of a land portion located in the vicinity of the wear indicator, as well as a tire vulcanizing die therefor. In order to achieve the object, the main groove of the pneumatic tire includes on a groove bottom a wear indicator protruding by a predetermined height and in wall portions of the main groove located at both sides of the wear indicator as viewed in a width direction of the groove, at least one of the wall portions of the main groove is formed with at least one concave portion opening to a tread surface.

6 Claims, 4 Drawing Sheets

TIRE VULCANIZING DIE AND PNEUMATIC TIRE

BACKGROUND OF THE INVENTION

1. Field of the Invention

The present invention relates to a pneumatic tire, which includes a tread portion formed with a main groove extending in a circumferential direction of the tire, the main groove provided on a groove bottom with a wear indicator protruding by a predetermined height, and a tire vulcanizing die therefor.

2. Description of the Related Art

In a pneumatic tire, in order to indicate that tire replacement timing has reached due to wear, in a main groove extending in a circumferential direction of the tire, a plurality of wear indicators is disposed on the groove bottom so as to protrude therefrom at intervals in the circumferential direction of the tire. Generally, the tread portion of the pneumatic tire is formed to have a substantially same thickness as viewed in the width direction of the tire. However, in the vicinity of the wear indicator, compared to other portions, a larger amount of rubber is required in order to form the wear indicator. This causes a shortage of rubber in the vicinity of the wear indicator. As a result, a shortage of rubber occurs to cause a "light" in a wear indicator 20 itself, at edge portions E and surfaces S of a land portion located in the vicinity of the wear indicator 20 as shown in FIG. 7.

As a method to prevent the light from occurring, Japanese Unexamined Patent Publication No. 2006-88585 describes a molding and vulcanizing method of a pneumatic tire using a tire vulcanizing die. In the method, compared to other portions to be vulcanized, a larger number of vent holes are provided in a portion in the vicinity of a wear indicator. However, in the tire vulcanizing die used in such a method, a considerably large number of vent holes has to be formed. Therefore, there arises a problem that a larger man-hour is required for manufacturing the die.

Japanese Unexamined Patent Publication No. 2002-225514 describes a pneumatic tire. In the pneumatic tire, concave portions are formed on both groove walls of a main groove as viewed in a width direction of the groove, where wear indicators are disposed at intervals in a circumferential direction of the tire. Further, Japanese Unexamined Patent Publication No. 2006-205824 describes a pneumatic tire. In the pneumatic tire, concave portions, which have a streamlined-shape as viewed from the top, are formed on side walls of a main groove straightly extending as viewed from the top of a tread portion. However, any of these pneumatic tires described in these publications are not designed for preventing occurrence of a light. Therefore, a light is not prevented from occurring in the vicinity of wear indicators.

SUMMARY OF THE INVENTION

The present invention has been made in view of the above circumstances. It is an object of the present invention to provide a pneumatic tire, in which a light is prevented from occurring on a wear indicator itself, edge portions and surfaces of a land portion located in the vicinity of the wear indicator, as well as a tire vulcanizing die therefor.

The above object can be achieved by the present invention as described below. That is, the present invention is directed to a tire vulcanizing die for a pneumatic tire, the pneumatic tire including a tread portion formed with a main groove extending in a circumferential direction of the tire, the main groove having on a groove bottom a wear indicator protruding by a predetermined height, the tire vulcanizing die comprising at least one protruding portion disposed for forming, in the pneumatic tire, a concave portion opening to a tread surface on at least one wall portion of the main groove in wall portions of the main groove located at both sides of the wear indicator as viewed in a width direction of the groove.

When the pneumatic tire is molded and vulcanized using the tire vulcanizing die described above, the vicinity of the wear indicator where a larger amount rubber is required for forming the wear indicator is swiftly filled with rubber due to the protruding portion. Here, in the tire vulcanizing die according to the present invention, the protruding portion forms a concave portion opening to the tread surface. As a result, shortage of rubber in the wear indicator itself, the edge portions and the surfaces of the land portion located in the vicinity of the wear indicator of the pneumatic tire is eliminated. Therefore, a light can be prevented from occurring in these portions.

On the other hand, different from the tire vulcanizing die according to the present invention, if the protruding portion is arranged to form a concave portion not opening to the tread surface, shortage of rubber cannot be satisfactorily eliminated particularly in the edge portions and the surfaces located in the vicinity of the wear indicator of the vulcanized pneumatic tire. As a result, occurrence of a light cannot be prevented in these portions.

In the tire vulcanizing die for a pneumatic tire, it is preferred that two or more protruding portions are disposed, and in the pneumatic tire, a distance between the concave portions measured at edge lines, each of which is formed between the wall portion of the main groove and the tread surface, is within a range of 0.3 to 3.5 mm. With this arrangement, while forming the concave portions on the wall portions of the main groove, the rigidity of the wall portions of the main groove can be ensured. As a result, the rigidity of the land portion located in the vicinity of the wear indicator of the molded and vulcanized pneumatic tire can be prevented from being reduced.

In the tire vulcanizing die for a pneumatic tire, it is preferred that in the pneumatic tire, a width of the concave portion in the width direction of the groove is 0.5 mm or more, and defining a volume of the wear indicator as V1 and a volume of the concave portion as V2, V1 and V2 are arranged so as to be within a range of $0.8V1 \leq V2 \leq 1.5V1$. When the pneumatic tire is molded and vulcanized using the tire vulcanizing die with the protruding portion(s) for forming the concave portion(s) that fulfills the above requirements, occurrence of a light can be prevented more effectively in the wear indicator itself, the edge portions and the surfaces of the land portion located in the vicinity of the wear indicator of the pneumatic tire.

The present invention is also directed to a pneumatic tire comprising: a tread portion formed with a main groove extending in a circumferential direction of the tire, the main groove including on a groove bottom a wear indicator protruding by a predetermined height, wherein in wall portions of the main groove located at both sides of the wear indicator as viewed in a width direction of the groove, at least one of the wall portions of the main groove is formed with at least one concave portion opening to a tread surface.

In the above pneumatic tire, shortage of rubber in the wear indicator itself, the edge portions and the surfaces of the land portion located in the vicinity of the wear indicator is eliminated, so that occurrence of a light can be prevented.

On the other hand, different from the pneumatic tire according to the present invention, if the concave portion is not opening to the tread surface, particularly in the edge portions and the surfaces of the land portion located in the vicinity of the wear indicator of the vulcanized pneumatic tire, shortage of rubber cannot be satisfactorily eliminated. As a result, a light cannot be prevented from occurring in these portions.

In the pneumatic tire, it is preferred that two or more concave portions are formed and a distance between the concave portions measured at edge lines, each of which is formed between the wall portion of the main groove and the tread surface, is within a range of 0.3 to 3.5 mm. With this arrangement, while forming the concave portion in the wall portion of the main groove, the rigidity of the wall portion of the main groove can be ensured. As a result, in the pneumatic tire arranged as described above, the rigidity of the land portion located in the vicinity of the wear indicator can be prevented from being reduced.

In the pneumatic tire, it is preferred that a width of the concave portion in the width direction of the groove is 0.5 mm or more, and defining a volume of the wear indicator as V1 and a volume of the concave portion as V2, V1 and V2 are arranged so as to be within a range of $0.8V1 \leq V2 \leq 1.5V1$. In the pneumatic tire formed with the concave portion(s) fulfilling the above requirements, a light can be prevented from occurring more reliably in the wear indicator itself, the edge portions and the surfaces of the land portion located in the vicinity of the wear indicator.

DETAILED DESCRIPTION OF THE PREFERRED EMBODIMENTS

Figure 1:
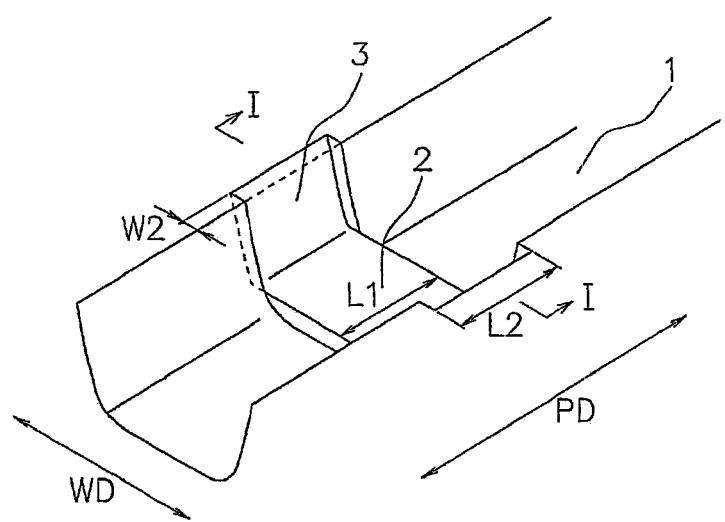
FIG. 1 is an enlarged perspective view illustrating an example of a wear indicator portion on a pneumatic tire according to the present invention.
Figure 2:
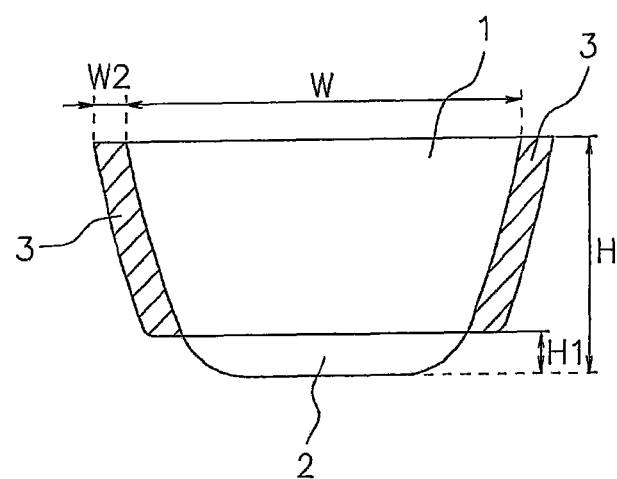
FIG. 2 is a cross-sectional view illustrating an example taken along a line I-I in FIG. 1.

Embodiments of the present invention will be described below. FIG. 1 is an enlarged perspective view illustrating an example of a wear indicator portion on a pneumatic tire according to the present invention. FIG. 2 is a cross-sectional view illustrating an example taken along a line I-I in FIG. 1. In the drawings, reference symbol "PD" indicates a circumferential direction of the tire as well as a direction of a main groove; and reference symbol "WD" indicates a width direction of the tire as well as a width direction of the main groove.

The pneumatic tire of the present invention includes, like ordinary pneumatic tires, a pair of bead cores, a carcass which is wound around the pair of bead cores to form a toroidal shape, a belt layer disposed at the outer side of a crown portion of the carcass as viewed in a radial direction of the tire, and a tread portion disposed at the outer side of the belt layer as viewed in the radial direction of the tire (not shown in the drawings). The tread portion is formed with at least a main groove 1 extending in the circumferential direction of the tire. In the present invention, the tread portion may be formed only with the main groove 1 extending in the circumferential direction of the tire and the tread portion may include a rib as a land portion; or the tread portion may be formed with the main groove 1 extending in the circumferential direction of the tire and lateral grooves extending in the width direction of the tire and the tread portion may include blocks as the land portion.

The main groove 1 includes a wear indicator 2 formed on the groove bottom thereof to protrude by a predetermined height. The wear indicator 2 is formed on the bottom of the main groove 1 in order to indicate a wear limit of the tread portion. A protruding height H1 thereof may be, for example, within a range of 1.35 to 2.2 mm. A length L1 of the wear indicator 2 in the circumferential direction may be, for example, within a range of 5 to 10 mm. Also, in the present invention, a depth H of the main groove 1 may be, for example, within a range of 4.5 to 14 mm; and a width W thereof may be, for example, within a range of 8 to 25 mm.

The present embodiment gives an example in which each of wall portions of the main groove located at the both sides of the wear indicator 2 as viewed in the width direction WD of the groove is formed with one concave portion 3 opening to a tread surface. In this case, the concave portion 3 is formed during vulcanizing the tire. Therefore, rubber is prevented from being short in the wear indicator itself, edge portions and the surfaces of the land portion located in the vicinity of the wear indicator. Accordingly, a light is prevented from occurring on these portions. The ratio between a length L2 of the concave portion 3 in the circumferential direction and the length L1 of the wear indicator 2 in the circumferential direction is preferably within a range of $0.8L1 \leq L2 \leq 1.5L1$; more preferably L2 is substantially equal to L1. Particularly, the length L2 of the concave portion 3 in the circumferential direction may be, for example, 4 to 15 mm. An edge line formed between the concave portion 3 and the tread surface may be chamfered.

The concave portion 3 of the present embodiment is provided with an opening having a rectangular shape in the tread portion as viewed from the top. In this embodiment, a width W2 of the concave portion 3 in the width direction WD of the groove is set to be 0.5 mm or more. Defining the volume of the wear indicator 2 as V1 and the volume of the concave portion 3 as V2, V1 and V2 are arranged to be within a range of $0.8V1 \leq V2 \leq 1.5V1$. With this arrangement, a light can be more reliably prevented from occurring on the wear indicator itself, the edge portions and the surfaces of the land portion located in the vicinity of the wear indicator. When V2 is less than 0.8V1, a light may not be satisfactorily prevented. When V2 is more than 1.5V1, a light can be satisfactorily prevented. However, since the rigidity of the abutting land portion is lowered, partial wear may be generated on the tread portion. In order to prevent a light from occurring and to effectively prevent partial wear of the tread portion, V1 and V2 are more preferably arranged to be within a range of $1.0V1 \leq V2 \leq 1.2V1$. In the present embodiment, a pair of concave portions 3 opening to the tread surface is formed on the wall portions of the main groove located at the both sides of the wear indicator 2 in the width direction WD of the groove. In this case, V2 is calculated as the sum of the volumes of the pair of concave portions 3 located at the both sides. In the present embodiment, the width of the concave portion 3 in the width direction of the groove is arranged to be generally identical in any portion in a depth direction of the groove.

In the present invention, in order to reliably obtain the function of the wear indicator 2 to indicate a wear limit of the tread portion, the concave portion 3 is preferably arranged so that the bottom end thereof in the depth direction of the groove is positioned at the top end of the wear indicator 2 in the depth direction of the groove, or at a position closer to the tread surface than the top end.

Next, a tire vulcanizing die used for manufacturing the above-described pneumatic tire is described below. The tire vulcanizing die is characterized in that at least one protruding portion for forming the concave portion 3 opening to the tread surface is disposed on at least one wall portion of the main groove in the wall portions of the main groove located at the both sides of the wear indicator 2 in the width direction WD of the groove. The shape of the protruding portion substantially coincides with the shape of the concave portion 3 of the vulcanized pneumatic tire. Therefore, when the width W2 of the concave portion 3 in the width direction WD of the groove is set to be 0.5 mm or more, and defining the volume of the wear indicator 2 as V1 and the volume of the concave portion 3 as V2 as described above, in order to arrange V1 and V2 to be within a range of $0.8V1 \leq V2 \leq 1.5V1$, the width of the protruding portion in the width direction of the groove is preferably set to be 0.5 mm or more; while defining the volume of the wear indicator 2 as V1 and the volume of the protruding portion as V2', V1 and V2' are preferably arranged to be within a range of $0.8V1 \leq V2' \leq 1.5V1$.

The pneumatic tire of the present invention is identical to ordinary pneumatic tires excepting a point that the main groove 1 includes the wear indicator 2 and the concave portions 3 as described above. Therefore, any conventionally known materials, shapes, structures, manufacturing methods and the like may be applied to the present invention.

Other Embodiments

Other embodiments of the present invention will be described below.

Figure 3:
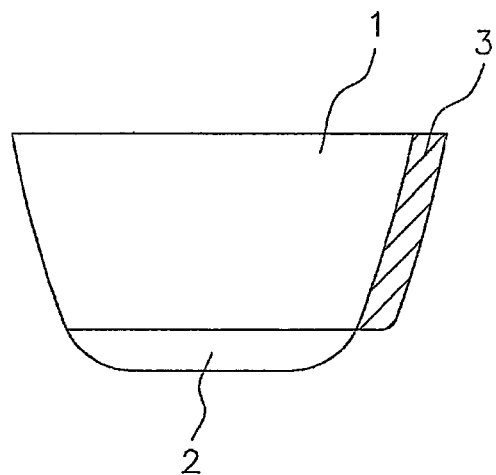
FIG. 3 is a cross-sectional view illustrating another example taken along the line I-I in FIG. 1.

(1) The above-described embodiment gives the example in which the concave portions 3 opening to the tread surface are formed on the wall portions of the main groove located at the both sides of the wear indicator 2 as viewed in the width direction WD of the groove. However, as shown in FIG. 3 illustrating a cross-sectional view taken along the line I-I in FIG. 1, in the present invention, only one concave portion 3 opening to the tread surface may be formed on one wall portion of the main groove located at one side of the wear indicator 2 as viewed in the width direction WD of the groove. Even in a case where only one concave portion 3 is formed on one wall portion of the main groove located at one side of the wear indicator 2 as viewed in the width direction WD of the groove, when the width W2 of the concave portion 3 in the width direction of the groove is set to be 0.5 mm or more while defining the volume of the wear indicator 2 as V1 and the volume of the concave portion 3 as V2, V1 and V2 are preferably arranged to be within a range of $0.8V1 \leq V2 \leq 1.5V1$. In this case, the volume of the single concave portion 3 is calculated as V2.

Figure 4:
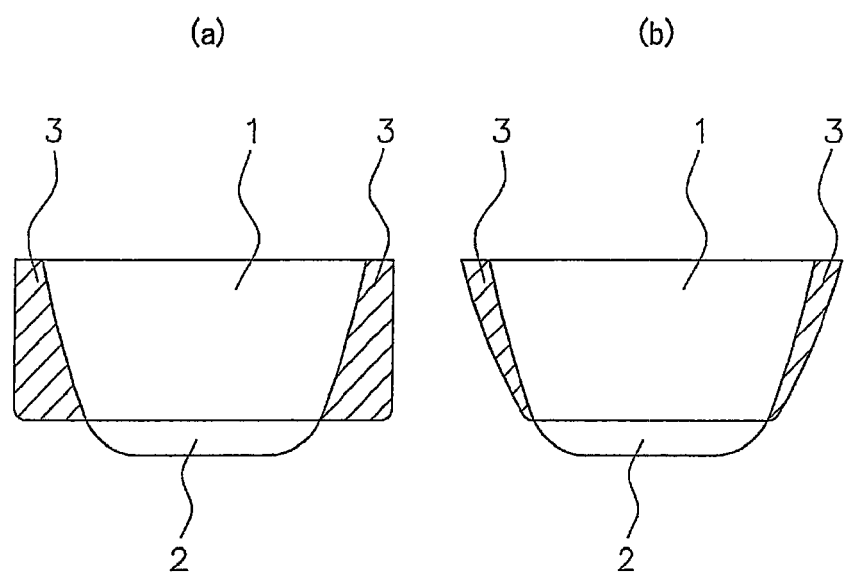
FIG. 4A and FIG. 4B are cross-sectional views each illustrating another example taken along the line I-I in FIG. 1.

(2) The above-described embodiment gives the example in which the width of the concave portion 3 as viewed in the width direction WD of the groove is arranged so as to be substantially the same at any point as viewed in the depth direction of the groove. However, in the present invention, the width of the concave portion 3 as viewed in the width direction WD of the groove may be arranged to be widened from the tread surface toward the groove bottom end as viewed in the depth direction of the groove as shown in FIG. 4A, which is a cross-sectional view taken along the line I-I in FIG. 1, or to be widened from the groove bottom end toward the tread surface as viewed in the depth direction of the groove as shown in FIG. 4B.

Figure 5:
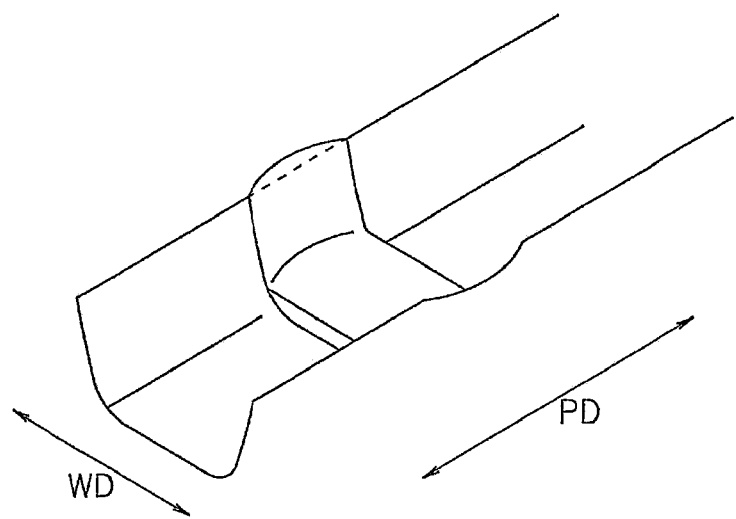
FIG. 5 is an enlarged perspective view illustrating another example of a wear indicator portion on a pneumatic tire according to the present invention.

(3) The above-described embodiment gives the example in which the concave portion 3 is provided with the opening having a rectangular shape in the tread portion as viewed from the top. However, in the present invention, the concave portion 3 may be arranged so as to have an arc-shaped opening in the tread portion as viewed from the top as shown in FIG. 5.

Figure 6:
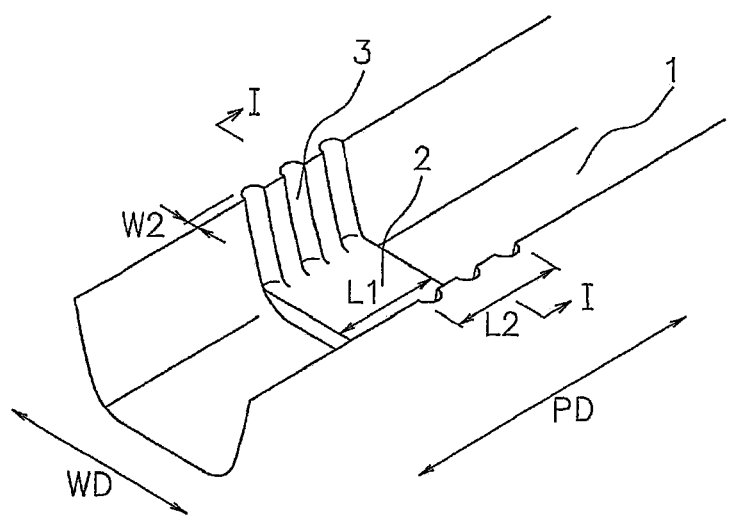
FIG. 6 is an enlarged perspective view illustrating another example of a wear indicator portion on a pneumatic tire according to the present invention.
Figure 7:
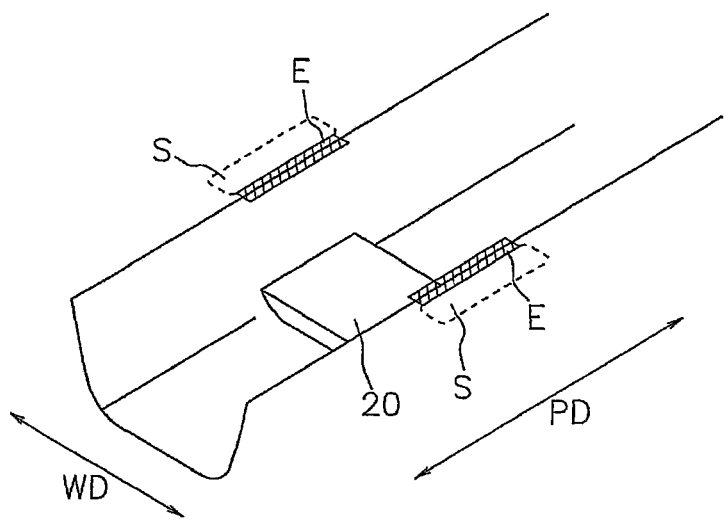
FIG. 7 is a perspective view illustrating an example of portions where a light occurs in a conventional pneumatic tire in which a wear indicator is formed on a bottom of a main groove.

(4) The above-described embodiment gives the example in which each of the wall portions of the main groove located at the both sides of the wear indicator 2 as viewed in the width direction WD of the groove is formed with one concave portion 3 opening to the tread surface. However, in the present invention, using a tire vulcanizing die provided with two or more protruding portions, two or more concave portions 3 opening to the tread surface may be arranged on at least one wall portion of the main groove in the wall portions of the main groove located at the both sides of the wear indicator 2 as viewed in the width direction WD of the groove. An embodiment shown in FIG. 6 gives an example in which three concave portions 3 opening to the tread surface are formed on the wall portions of the main groove located at the both sides of the wear indicator 2 as viewed in the width direction WD of the groove. In this embodiment, the distance between the concave portions 3 measured at the edge line formed between the wall portion of the main groove and the tread surface is arranged to be within a range of 0.3 to 3.5 mm. In the pneumatic tire according to this embodiment, three concave portions 3 are formed on the wall portions of the main groove, respectively; thereby a light is prevented from occurring as well as the rigidity of the land portion located in the vicinity of the wear indicator 2 can be prevented from being reduced. In this embodiment, the openings of the concave portions 3 are formed in an arc-like shape in the tread portion as viewed from the top.

EXAMPLES

Examples and Comparative Example will be described below to demonstrate the structure and the effect of the present invention. "Light reduction ratio (%)" was evaluated as described below.

Tire vulcanizing dies for each of Examples 1 to 4 and Comparative Example 1 were manufactured. Using these dies, pneumatic tires (215/60R16) for passenger car were prepared (100 each). On the prepared pneumatic tires, relative to every point where the wear indicator was formed, out of the wear indicator 2 itself, the edge portions of the land portion located in the vicinity of the wear indicator 2, and the surfaces of the land portion located in the vicinity of the wear indicator, the points where no light was found were counted. Based on the count results, "(light reduction ratio (%))=(the number of points where no light was found)/(the total number of the wear indicators 2)" was calculated.

Example 1

Using the tire vulcanizing die provided with the protruding portions for forming the concave portion 3 shown in FIG. 1 and FIG. 2, pneumatic tires were prepared. Here, referring to FIG. 2, V1 and V2 were set to satisfy $0.8V1=V2$ by setting the following factors; i.e., H=8.5 mm, W=12 mm, H1=1.8 mm, W2=0.48 mm. Using these tires, the light reduction ratio was evaluated. The evaluation result is shown in Table 1.

Example 2

There were prepared pneumatic tires, which have the same structure as that of Example 1 excepting a point that, referring to FIG. 2, V1 and V2 were arranged to satisfy V1=V2 by setting W2=0.6 mm. Using these tires, the light reduction ratio was evaluated. The evaluation result is shown in Table 1.

Example 3

There were prepared pneumatic tires, which have the same structure as that of Example 1 excepting a point that, referring to FIG. 2, V1 and V2 were arranged to satisfy 1.2V1=V2 by setting W2=0.72 mm. Using these tires, the light reduction ratio was evaluated. The evaluation result is shown in Table 1.

Example 4

There were prepared pneumatic tires, which have the same structure as that of Example 1 excepting a point that, referring to FIG. 2, V1 and V2 were arranged to satisfy 1.5V1=V2 by setting W2=0.9 mm. Using these tires, the light reduction ratio was evaluated. The evaluation result is shown in Table 1.

Comparative Example 1

Using a tire vulcanizing die provided with no protruding portion, pneumatic tires provided with no concave portion 3 were prepared. Using these tires, the light reduction ratio was evaluated. The evaluation result is shown in Table 1.

TABLE 1

| | Example 1 | Example 2 | Example 3 | Example 4 | Comparative Example 1 |
|---|---|---|---|---|---|
| Light reduction ratio | 85 | 100 | 100 | 100 | 70 |

From the results in Table 1, in the pneumatic tires, which were prepared using the respective tire vulcanizing dies of Examples 1 to 4, the following facts are found. That is, compared to the pneumatic tires prepared using tire vulcanizing die of Comparative Example 1, occurrence of a light is reduced. Particularly, it is found that, in the pneumatic tires prepared using the tire vulcanizing dies of Examples 2 to 4 respectively with the setting within a range of $1.0V1 \leq V2 \leq 1.2V1$, a light is reliably prevented from occurring. However, it was found that, in the pneumatic tires prepared using the tire vulcanizing die of Example 4, since the rigidity of the land portion abutting on the concave portion 3 was reduced, partial wear was generated on the tread portion.

What is claimed is:

1. A tire vulcanizing die for a pneumatic tire, the pneumatic tire including a tread portion formed with a main groove extending in a circumferential direction of the tire, the main groove having on a groove bottom a wear indicator protruding by a predetermined height, the tire vulcanizing die comprising a protruding portion for forming, in the pneumatic tire, the main groove, a recessed portion for forming the wear indicator, and at least one protruding portion disposed for forming a concave portion opening to a tread surface and extending to a tread contact surface on at least one wall portion of the main groove but only in wall portions of the main groove that are located at and in contact in a groove depth direction with one or both sides of the wear indicator as viewed in a width direction of the groove.

2. The tire vulcanizing die according to claim 1, wherein two or more protruding portions are disposed for forming, in the pneumatic tire, two or more concave portions, wherein a distance between the concave portions measured at edge lines, each of which is formed between the wall portion of the main groove and the tread surface, is within a range of 0.3 to 3.5 mm.

3. The tire vulcanizing die according to claim 1, wherein, in the pneumatic tire, a width of the concave portion in the width direction of the groove is 0.5 mm or more, and defining a volume of the wear indicator as V1 and a volume of the concave portion as V2, V1 and V2 are arranged so as to be within a range of $0.8V1 \leq V2 \leq 1.5V1$.

4. A pneumatic tire comprising: a tread portion formed with a main groove extending in a circumferential direction of the tire, the main groove including on a groove bottom a wear indicator protruding by a predetermined height, wherein only in wall portions of the main groove located at and in contact in a groove depth direction with one or both sides of the wear indicator as viewed in a width direction of the groove, at least one of the wall portions of the main groove is formed with at least one concave portion opening to a tread surface, and extending to a tread contact surface.

5. The pneumatic tire according to claim 4, wherein two or more concave portions are formed and a distance between the concave portions measured at edge lines, each of which is formed between the wall portion of the main groove and the tread surface, is within a range of 0.3 to 3.5 mm.

6. The pneumatic tire according to claim 4, wherein a width of the concave portion in the width direction of the groove is 0.5 mm or more, and defining a volume of the wear indicator as V1 and a volume of the concave portion as V2, V1 and V2 are arranged so as to be within a range of $0.8V1 \leq V2 \leq 1.5V1$.

\* \* \* \* \*